United States Patent [19]

Ginns

[11] Patent Number: 4,589,278
[45] Date of Patent: May 20, 1986

[54] DETECTION OF TOP OF STROKE OF PISTON

[75] Inventor: Haskell Ginns, Belmont, Mass.

[73] Assignee: Indikon Corporation, Cambridge, Mass.

[21] Appl. No.: 615,993

[22] Filed: May 31, 1984

[51] Int. Cl.$^4$ .......................................... G01M 15/00
[52] U.S. Cl. .................................................. 73/117.3
[58] Field of Search .................. 73/116, 119 R, 117.2, 73/117.3; 364/551; 123/416

[56] References Cited

U.S. PATENT DOCUMENTS

| | | | |
|---|---|---|---|
| 2,817,966 | 12/1957 | Wright et al. | 73/116 |
| 3,055,211 | 9/1962 | Meador et al. | 73/116 |
| 3,456,497 | 7/1969 | Eberl | 73/116 |
| 3,475,952 | 11/1969 | Schmalbruch . | |
| 3,572,103 | 3/1971 | Marino | 73/116 |
| 3,625,054 | 12/1971 | Vesper et al. | 73/115 |
| 3,650,149 | 3/1972 | Howes | 73/117.3 |
| 4,002,155 | 1/1977 | Harned et al. | 123/148 E |
| 4,050,296 | 9/1977 | Benedict | 73/116 |
| 4,064,747 | 12/1977 | Rackliffe et al. | 73/116 |
| 4,083,234 | 4/1978 | Aono et al. | 73/116 |
| 4,179,922 | 12/1979 | Bouverie et al. | 73/116 |
| 4,292,670 | 9/1981 | Reid et al. | 364/431 |
| 4,295,363 | 10/1981 | Buck et al. | 73/117.3 |
| 4,301,678 | 11/1981 | Full et al. | 73/116 |
| 4,325,128 | 4/1982 | Abnett et al. | 364/511 |
| 4,337,647 | 7/1982 | Radcliffe et al. | 73/116 |
| 4,348,893 | 9/1982 | Hendrix et al. | 73/116 |
| 4,407,155 | 10/1983 | Sundeen | 73/116 |
| 4,468,956 | 9/1984 | Merlo | 73/119 R X |
| 4,503,505 | 3/1985 | Damson et al. | 364/551 X |

OTHER PUBLICATIONS

Sensors, The Journal of Machine Perception, May 1984, 30 pages.

*Primary Examiner*—Jerry W. Myracle
*Attorney, Agent, or Firm*—Weingarten, Schurgin, Gagnebin & Hayes

[57] ABSTRACT

Apparatus for determining time of occurrence of the maximum excursion, or top dead center or bottom dead center, of an engine piston or similar structure. The piston excursion is continuously measured, and a signal, corresponding to the portion of the cycle having the closest proximity, is selected. The signal is compared to a threshold, and the duration wherein the signal exceeds the threshold is measured by a first digital counter. The measured duration is divided by two, the resulting number counted by a second counter during the subsequent piston cycle, beginning simultaneously with the first counter. The second counter completes the count of one-half of the duration at the midpoint of the measured duration. The apparatus produces an output signal at the midpoint of the measured duration, which corresponds to the maximum excursion, or top dead center or bottom dead center, of the piston motion.

2 Claims, 1 Drawing Figure

DETECTION OF TOP OF STROKE OF PISTON

FIELD OF THE INVENTION

The present invention relates to distance measuring apparatus, and in particular, apparatus for measuring the top dead center or bottom dead center of a cyclical reciprocating piston or other object.

BACKGROUND OF THE INVENTION

Improvements in engine performance, efficiency, and decrease in emissions have required increasingly accurate monitoring and control of the engine combustion process. Moreover, optimization of the process changes as operating conditions change. Such conditions include engine rpm, applied load, temperature, humidity, etc. A key piece of data in the optimization of engine performance is the position of the particular cylinder piston as the engine operates. Previous efforts to determine the piston position have used indirect measurement of the position of the piston by measuring various engine elements mechanically connected thereto, such as flywheel position and ignition timing. However, in view of the variations in tolerances of the connecting members between the piston and the flywheel or ignition timing element, and the mechanical distortions to the connecting members due to a variation in loading torque, the resulting errors in measurement of the top or bottom of the piston excursion, are unacceptable for optimal engine operation.

SUMMARY OF THE INVENTION

The present invention determines the exact point of maximum piston excursion, or "top dead center," to within 0.1° of crankshaft rotation in a reciprocating engine or device. The piston excursion is measured by placing a proximity probe in the vicinity of the piston head near its maximum excursion point. The probe provides a continuously varying output signal corresponding to the distance between the probe and the reciprocating piston. The output signal from the position-sensing probe is differenced with a reference or threshold DC voltage, whose value is equal to the probe signal when the piston is within a few degrees (shaft rotation) of its extreme position. The difference signal is then amplified and squared up into a rectangular binary signal having a logical high and low value. The low-to-high and high-to-low transition points of the signal correspond to the probe signal crossing the reference signals. The leading edge of the binary signal corresponds to the transition when the piston is coming closer to the sensor, and the trailing edge corresponds to the transition as the piston is moving away from the sensor. Each edge occurs at the same position of the piston away from top or bottom dead center. Assuming that engine speed is constant over the few degrees either side of the maximum excursion for each piston and also that engine speed is constant from engine cycle to engine cycle, the time at which the piston is at top or bottom dead center occurs at a time midway between the leading and trailing edge of the binary signal. Such an assumption is valid in typical cases.

A signal indicating top or bottom dead center is generated by enabling a first counter to be incremented during the time period between the leading and trailing edges of the binary signal, which yields a binary digital number. The binary digital number is divided by two and is applied to a second counter. On the next cycle, the second counter then decrements at the same rate that the first counter is incremented, and begins at the same time as does the first counter. The second counter completes its count at a time exactly midway between the leading and trailing edges of the binary signals. At the completion of its count, the second counter produces an output signal at a time exactly equal to the maximum excursion, or time of top dead center piston location.

BRIEF DESCRIPTION OF THE DRAWING

These and other features of the present invention will be better understood from the following, solely exemplary, detailed description, together with the drawing, including a single FIGURE showing a functional block diagram of the present invention, with representations of the signal at various points therein.

DETAILED DESCRIPTION OF THE INVENTION

Figure 1:
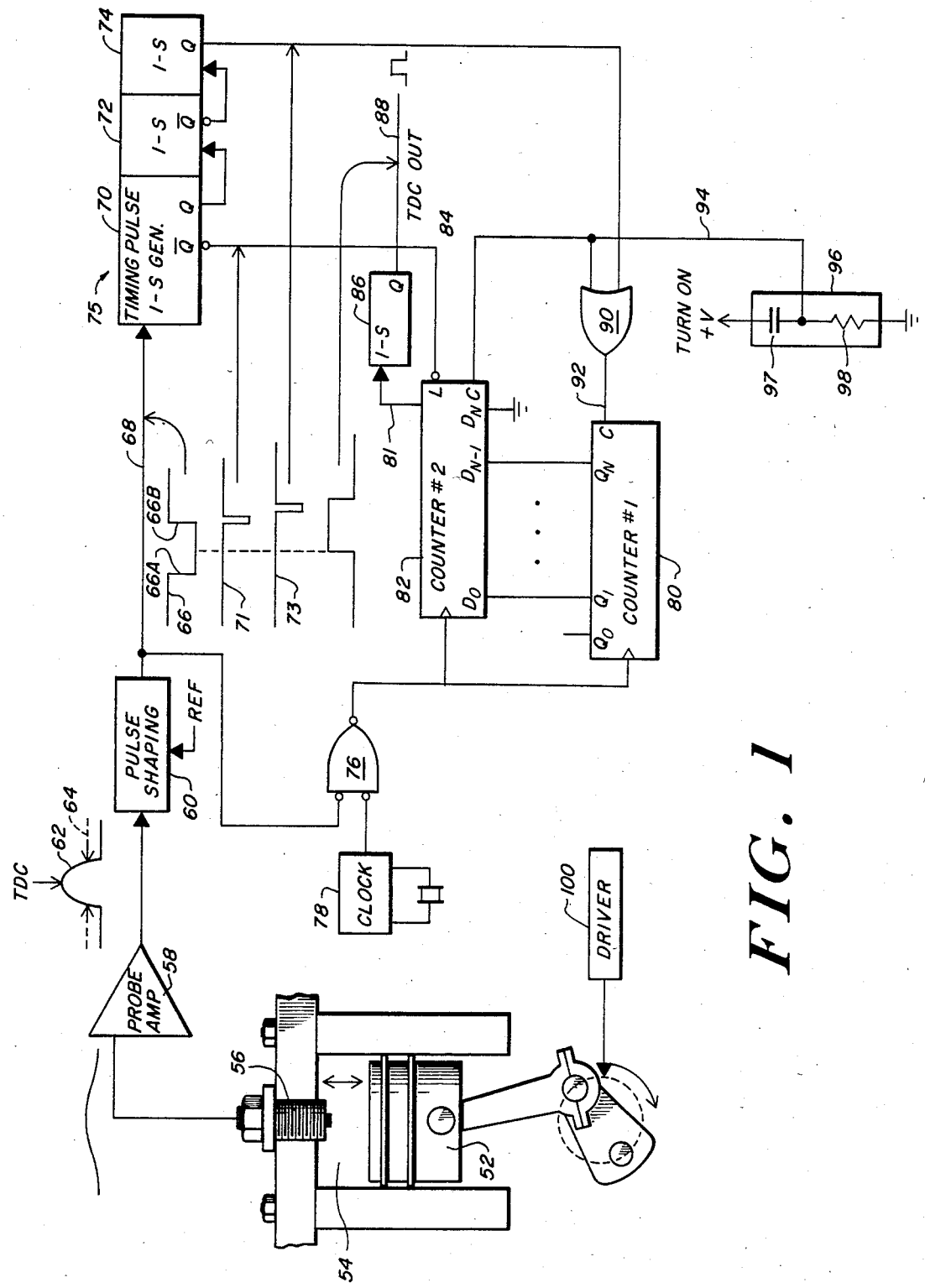

The system according to the present invention determines the time of occurrence of top dead center or the maximum excursion of a piston 52 in a cylinder 54 according to a signal developed by a sensor or distance-measuring probe 56. The sensor 56, typically an eddy current proximity probe, develops an output signal having a continuously varying output corresponding to the proximity of the object sensed. The sensor 56 may be mounted permanently or temporarily in the cylinder head for continuous measurement or initial calibration of top dead center against crank shaft position. The sensor must only be repeatable in accuracy over the short term between cycles of engine rotation.

The signal provided by the sensor 56 has the waveform 62 in the proximity of the top dead center and is amplified by an amplifier 58. A pulse-shaping circuit 60, compares it to a reference value 64, and provides a difference output 66 as a binary signal. The binary signal has a leading edge 66A which is applied to an AND gate 76 along with the output of a clock circuit 78. Gate 76 passes the periodic clock signal generated by clock circuit 78 to the clock inputs of a first counter 80 and a second counter 82. The first counter 80 receives clock pulses and increments during the time period between the leading edge 66A and trailing edge 66B of the signal 66, to accumulate a corresponding binary digital number at the output of the counter 80. Coincident with the trailing edge 66B of the signal 66, the counter 80 stops receiving clock pulses and ceases counting. The second counter 82 is then loaded with half the value in the first counter in response to load pulse 71 generated by a one-shot monostable multivibrator 70 on lead 84, discussed below.

According to the present invention, the leading and trailing edges, 66A and 66B respectively, occur at the same point of piston excursion. The maximum excursion occurs at a point midway between the leading edge 66A and trailing edge 66B. The point of maximum excursion is detected by the second counter 82 decrementing the value stored in it during counting of the first counter. This number will be accurate despite the delay of one cycle since the engine does not change speed appreciably.

To provide a count equal to one-half of the count of the first counter 80, the second counter 82 receives the output from the first counter 80, with the signals shifted to exclude the least significant bit of the counter 80 from counter 82. Also, the most significant bit input of counter 82 receives no signal from counter 80. The counter 82 receives the same clocking signal as does counter 80 from gate 76. When the counter 82 completes its count, an output signal on lead 81 is produced, which has a signal transition at the point of maximum piston excursion. The counter 82 output signal is converted into a pulse signal of selectable length by a one-shot monostable multivibrator 86 having an output on lead 88, the time of the leading edge of the signal corresponding to the time of maximum piston excursion for the top dead center piston location.

The binary signal 66 on lead 68 is also received by a timing pulse generator which includes a plurality of one-shot monostable multivibrators 70-74 connected in a sequence. These are sequentially activated in cascade by the trailing edge 66B of the signal from the pulse-shaping circuit 60. The one-shot multivibrators are connected in sequence to provide a first pulse 71 and a second pulse 73, spaced apart in time by the time delay formed by intermediate one-shot monostable multivibrator 72. The first pulse 71 on lead 84 causes second counter 82 to be loaded with one half of the completed count of the first counter 80. After each cycle or revolution of the piston, the first counter 80 is reset to zero by a signal generated by the one-shot multivibrator 74 provided through an OR gate 90 on a lead 92. Moreover, both the first counter 80 and second counter 82 are reset or cleared by a signal generated on lead 94 from a reset circuit 96, which provides a logical high-level reset signal to counters 80 and 82 for a short duration which extends after the power supply has come to full potential, thereafter dropping to a logical low value. The reset circuit 96 typically comprises a capacitor 97 to the positive power supply and a return resistor 98 to ground.

The probe amplifier 58 and pulse-shaping circuit 60 includes operational amplifiers and comparators known in the art. The time pulse generator including multivibrators 70-74 and pulse-forming multivibrators 86, comprises integrated circuits, typically a 74C221. The gates 76 and 90 are logical OR gates, typically a 74C32, and the clock is a crystal oscillator circuit including an associated integrated circuit MC14521B. Moreover, the first counter 80 and the second counter 82 each comprises three up-down counter integrated circuits 74C193. However, the number of integrated circuits included in each counter and the clock period may be varied to provide the time resolution desired.

The invention may be used with any reciprocating system, internal compression engines, pumps and compressors being typical examples. A driver 100 may be employed to impart motion to piston 52, if not self powered. Other modifications and substitutions to the above-described system made by one skilled in the art are considered within the scope of the present invention. The present invention is therefore not to be limited, except by the following claims.

What is claimed is:

1. A system for determining the maximum excursion of each stroke of a driven reciprocating, piston element relative to a cylinder head for said piston, comprising:
   sensing means located within said cylinder head and spaced apart from said element for providing a signal representing the distance between said sensing means and said piston element only as said piston element approaches said cylinder head;
   threshold means for providing an output signal when said distance respresenting signal exceeds a signal threshold representative of said piston being only within a few degrees of the maximum excursion of said piston element relative to said cylinder head;
   counter means for counting during the occurrence of said output signal to provide a count representing the duration of the output signal of said threshold means; and
   means for counting to the half point of said count on the next succeeding stroke of the piston element to provide an indication of actual piston maximum excursion as it occurs.

2. The system of claim 1, wherein said distance representing signal is a continuously changing signal, and said threshold means includes:
   a source of a reference signal;
   comparator means receiving said distance representing signal and said reference signal, providing an output signal when said distance representing signal exceeds said reference signal; and
   pulse-shaping means receiving the output signal of said comparator means and providing a pulse signal having transition points coinciding with the time in which said distance representing signal exceeds said reference signal.

* * * * *